United States Patent [19]

Brierley et al.

[11] Patent Number: 4,916,769
[45] Date of Patent: Apr. 17, 1990

[54] DISPERSE MONO-AZO DYE MIXTURE FOR DYEING SYNTHETIC TEXTILES

[75] Inventors: David Brierley, Royton; Leslie A. Mather, Westhoughton; Barry H. Meyrick, Urmston, all of Great Britain

[73] Assignee: Imperial Chemical Industries plc, London, England

[21] Appl. No.: 319,185

[22] Filed: Mar. 6, 1989

[30] Foreign Application Priority Data

Mar. 10, 1988 [GB] United Kingdom ............... 8805690

[51] Int. Cl.$^4$ ............................................. C09B 29/00
[52] U.S. Cl. ........................................... 8/639; 8/693; 8/922
[58] Field of Search .................................. 8/639

[56] References Cited
U.S. PATENT DOCUMENTS 3,264,052 8/1966 Rhyner ........................... 8/639

Primary Examiner—A. Lionel Clingman
Attorney, Agent, or Firm—Cushman, Darby & Cushman

[57] ABSTRACT

A disperse dye mixture comprising from 85 to 95% by weight of a dye of the formula:

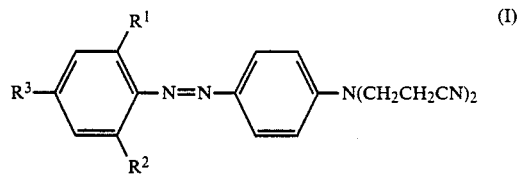

(I)

and from 15 to 5% by weight of a dye of the formula:

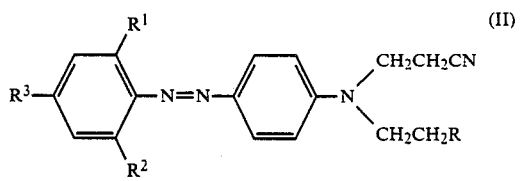

(II)

wherein
R represents —OH or —OCOR$^4$ wherein R$^4$ represents $C_{1-4}$-alkyl or $C_{1-4}$alkoxy;
each of R$^1$ and R$^2$, independently, represents hydrogen, halogen, $C_{1-4}$-alkyl or $C_{1-4}$-alkoxy; and
R$^3$ represents hydrogen, halogen or nitro.

13 Claims, No Drawings

DISPERSE MONO-AZO DYE MIXTURE FOR DYEING SYNTHETIC TEXTILES

This invention relates to disperse dyes and more particularly to mixtures of disperse dyes and to methods for their manufacture and use.

Several methods are known for applying disperse dyes to synthetic textile materials, for example polyethylena terephthalate textile materials which may be in the form of filaments, loose fibers, yarn or woven or knitted fabrics.

In one method, known as package dyeing, an aqueous dispersion of dye is circulated through packages of yarn, first in one direction then in the other. When some dyes are applied by this method, it is found that solid dye is deposited on the surface of the textile fibers giving uneven coloration and poor fastness to rubbing. One dye with which this problem is experienced is CI Disperse Orange 44 having the formula:

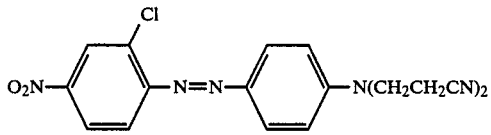

In an attempt to solve the problem, it has been proposed in United Kingdom Patent Specification No.960752 to use CI Disperse Orange 44 in admixture with a dye of the formula:

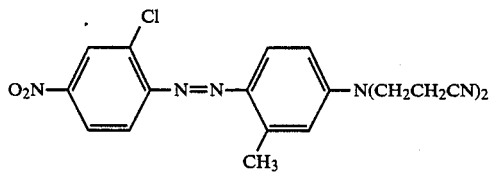

Unfortunately, the two dyes differ in shade significantly and, accordingly, when applied to textile materials, the resulting mixture of dyes does not provide the preferred shade.

It has now been found that the package dyeing performance of CI Disperse Orange 44 and related dyes can be improved with minimal shade change by using the dyes in the form of the mixtures hereinafter defined.

Thus, according to the invention, there is provided a disperse dye mixture comprising from 85 to 95% by weight of a dye of the formula:

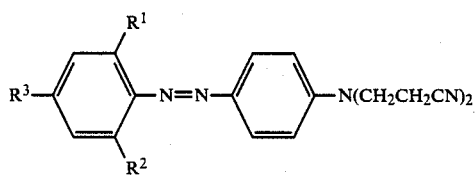

and from 15 to 5% by weight of a dye of the formula:

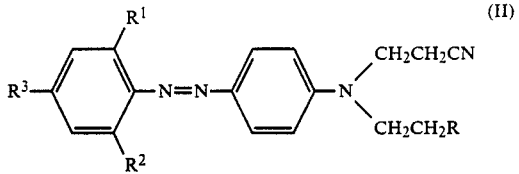

wherein
R represents —OH or —OCOR$^4$ wherein R$^4$ represents C$_{1-4}$-alkyl or C$_{1-4}$-alkoxy;
each of R$^1$ and R$^2$, independently, represents hydrogen, halogen, C$_{1-4}$-alkyl or C$_{1-4}$-alkoxy; and
R$^3$ represents hydrogen, halogen or nitro.

It is preferred that R$^1$ is halogen and R$^2$ is hydrogen or halogen. It is also preferred that R$^3$ is nitro. R$^4$ is preferably methyl.

In the dyes of Formula I and Formula II, any halogen substituents represented by R$^1$, R$^2$ or R$^3$ are preferably chlorine or bromine.

The dye mixtures may contain one or more dyes of Formula I together with one or more dyes of Formula II although, in general, the dyeing difficulties referred to above can be substantially eliminated by the use of mixtures containing a single dye of each formula.

Preferred mixtures contain from 7.5 to 12.5%, especially from 9 to 11%, by weight of the dye or dyes of Formula II and, correspondingly, from 92.5 to 87.5, especially from 91 to 89%, by weight of a dye or dyes of Formula I.

The mixtures of greatest interest contain CI Disperse Orange 44 together with a dye of the formula:

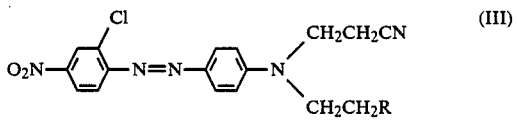

wherein R is as defined above.

The mixtures of the invention may be prepared by physically mixing a dye of Formula I and a dye of Formula II, the individual dyes being known. Thus, CI Disperse Orange 44 may be mixed with CI Disperse Red 54 or CI Disperse Red 56, the dyes of Formula III wherein R is —OCOCH$_3$ and —OH respectively.

Alternatively, the mixtures may be prepared by diazotising an aromatic amine of the formula:

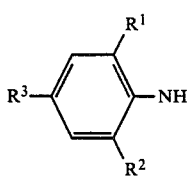

wherein R$^1$, R$^2$ and R$^3$ have the meanings given above and coupling the resulting diazo compound with a mixture of a coupling component of the formula:

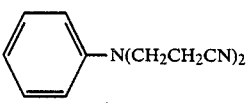

and a coupling component of the formula:

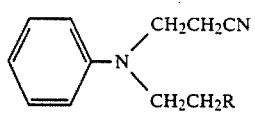

wherein R has the meaning given above, the coupling components being used in such proportions as to give a dye mixture of the desired composition.

The diazotisation and coupling may be performed using methods conventionally used for these reactants and the mixtures so formed may be isolated using known techniques.

The dye mixtures may be formulated in known manner, either as liquids suitable for continuous dyeing and printing applications, with dispersing agents, stabilisers and humectants, or as fine powders suitable for high temperature (exhaust) dyeing applications with dispersing agents suitable for this application.

The mixtures of the invention are valuable for colouring synthetic textile materials, especially secondary cellulose acetate, cellulose triacetate, polyamide such as polyhexamethylene adipamide and, above all, aromatic polyester such as polyethylene terephthalate textile materials. Such materials can be in the form of filaments, loose fibers, yarn or woven or knitted fabrics. The mixtures are also useful for colouring fiber blends containing one or more synthetic fibrous material together with other types of fiber, for example polyester-cotton blends.

The mixtures are particularly well adapted for application, optionally in conjunction with other disperse dyes, by package dyeing techniques but other conventional dyeing, padding or printing processes may be used if desired, the mixtures being applied as aqueous dispersions, optionally in conjunction with other disperse dyes. The dye mixtures, especially mixtures of CI Disperse Orange 44 and a dye of Formula III provide useful black shades when employed in conjunction with blue dyes such as CI Disperse Blue 79.

The invention is illustrated but not limited by the following Examples.

EXAMPLE 1

2-chloro-4-nitroaniline (17.4 g) is stirred in water (100 ml) and concentrated hydrochloric acid (26 ml) for 1 hour and the yellow suspension is then cooled to 0° C. A solution of 5N sodium nitrite (20 ml) is then added over 5 minutes. After stirring for 1 hour, a complete solution has formed and excess nitrous acid is removed by the addition of sulphamic acid (1.0 g) at 0° C. Into this diazo solution are simultaneously added solutions of N,N-bis-2-cyanoethylaniline (18.0 g dissolved at 45° C. in 100 ml of 20% hydrochloric acid) and N-(2-cyanoethyl)-N-(2-acetoxyethyl)aniline (2.4 g dissolved in 10 ml of 20% hydrochloric acid). The addition is completed in 5 minutes and stirring is continued at 0°–5° C. for 1 hour. The pH is then raised to 4.0 by the addition of 32% sodium hydroxide solution (70 ml) and the thick suspension is heated to 80° C. and filtered hot. The filter cake is washed well with hot water and dried at 60° C. to yield 30.89 g of a dye mixture containing 90% by weight of:

2-chloro-4-nitroaniline→N,N-bis-cyanoetylaniline
(CI Disperse Orange 44)

and 10% by weight of 2-chloro-4-nitroaniline→N-cyanoethyl-N-acetoxyethylaniline (CI Disperse Red 54)

EXAMPLE 2

Using the procedure described in Example 1, a dye mixture containing 92.5 % by weight of CI Disperse Orange 44 and 7.5% by weight of CI Disperse Red 54 is prepared.

A 300 g package of texturised polyester yarn is placed in the Longclose dyeing machine and secured in place by a tightened metal lid. The reservoir of the machine is charged with 7 liters of deionised water followed by 70 ml of a 10% solution of a conventional dispersing agent and the circulating pump switched on with the flow direction set for "in-to-out".

The temperature is then raised to 45° C. and 5.2 g of disperse dye in 150 ml of water are then added to the reservoir and the liquor allowed to circulate for approximately 10 minutes. The pH of the dye liquor is checked and, if necessary, adjusted to 5.0–5.8 by small additions of 10% acetic acid.

Once the temperature reaches 60° C., the reservoir lid is closed pressurising the dyeing vessel and the temperature is then raised to 130° C. The machine is maintained at the top dyeing temperature of 130° C. for 45 minutes, whereupon the pressure is released, the spent dyeing liquor drained away and the package is then rinsed with deionised water at 50° C.

On completion of the rinsing sequence, the package is removed, hydroextracted and then finally air dried. The level of deposition on the package is then assessed and from experience, it has been found that disperse dyes which give minimal (trace, little) deposit in this test can be safely recommended for package and beam dyeing on the commercial scale.

The above procedure is carried out using (1) CI Disperse Orange 44 and (2) the dye mixture prepared as described above, the dyes being formulated with a lignosulphonate dispersing agent to contain 37.5% colour.

Dyeing by the above method at a 25:1 liquor to goods ratio and approximately 2× standard depth, it is found that CI Disperse Orange 44 gives severs deposition problems such that it can only be successfully recommended up to 1 × standard depth of shade applied, thus severely restricting its usefulness. The dye mixture on the other hand, gives a significantly improved package dyeing performance with minimal deposition (trace) and could be confidently recommended for commercial use up to 2 × standard depth.

EXAMPLE 3

2-chloro-4-nitroaniline (3.48 g) is stirred in water (20 ml) and concentrated hydrochloric acid (5.2 ml) for 1 hour and the yellow suspension is then cooled to 0° C. A solution of 5N sodium nitiite (4 ml) is then added over 5 minutes. After stirring for 1 hour, a complete solution has formed and excess nitrous acid is removed by the addition of sulphamic acid (1.0 g) at 0° C. Into this diazo solution are simultaneously added solutions of N,N-bis-2-cyanoethylaniline (3.6 g dissolved at 45° C. in 20 ml of 20% hydrochloric acid) and N-(2-cyanoethyl)-N-(2-hydroxyethyl)aniline (0.4 g dissolved in 2 ml of 20% hydrochloric acid). The addition is completed in 5 minutes and stirring is continued at 0°–5° C. for 1 hour. The pH is then raised to 4.0 by the addition of 32% sodium hydroxide solution (14 ml) and the thick suspension is heated to 80° C. and filtered hot The filter cake is washed well with hot water and dried at 60° C. to yield 5.9 g of a dye mixture containing 90% by weight of:

2-chloro-4-nitroaniline→N,N-bis-cyanoethylaniline (CI Disperse Orange 44)

and 10% by weight of 2-chloro-4-nitroaniline→N-cyanoethyl-N-hydroxyethylaniline (CI Disperse Red 54)

When this dye mixture is applied to texturised polyester yarn by the method described in Example 2, a significant improvement in package dyeing performance, compared with the use of CI Disperse Orange 44 alone, is again observed.

EXAMPLE 4

If the orange mixture prepared in Example 1 is then co-milled in the presence of conventional dispersing agents with CI Disperse Blue 79.1, then black mixtrures with excellent package dyeing performances are obtained.

For example, a useful black liquid can be prepared by milling 6.3 parts of the orange mixture (Example 1) with 17.2 parts of CI Disperse Blue 79.1 in the presence of a lignosulphonate dispersing agent such that the final product contains 23.5% colour. Dyeing with this liquid on the Longclose by the method outlined previously at 2 × standard depth of shade gives acceptable package dyeing results with minimal deposition. However if the orange component used in the black mixture described above is replaced by CI Disperse Orange 44 then severe deposition problems are encountered such that the resultant mixture cannot be recommended for package or beam dyeing.

EXAMPLE 5

A second useful black liquid can be prepared by milling 7.9 parts of the orange mixture (Example 1) with 14.9 parts of CI Disperse Blue 79.1 in the presence of a lignosulphonate dispersing agent such that the final product contains 22.8% colour. Dyeing with this liquid on the Longclose by the method outlined previously at 2 × standard depth of shade gives acceptable package dyeing results with minimal deposition. However if the orange component used in the black mixture described above is replaced by CI Disperse Orange 44 then severe deposition problems are encountered such that the resultant mixture cannot be recommended for package or beam dyeing.

We claim:

1. A disperse dye mixture comprising from 85 to 95% by weight of a dye of the formula:

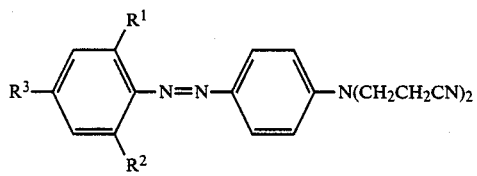

and from 15 to 5% by weight of a dye of the formula:

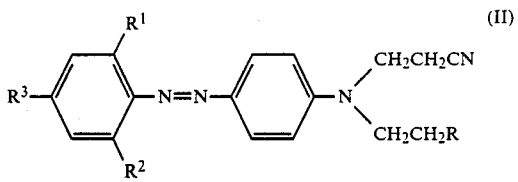

wherein
R represents —OH or —OCOR$^4$ wherein R$^4$ represents C$_{1-4}$-alkyl or C$_{1-4}$-alkoxy;
each of R$^1$ and R$^2$, independently, represents hydrogen, halogen, C$_{1-4}$-alkyl or C$_{1-4}$-alkoxy; and
R$^3$ represents hydrogen, halogen or nitro.

2. A disperse dye mixture according to claim 1 wherein R$^1$ is halogen and R$^2$ is hydrogen or halogen.
3. A disperse dye mixture according to claim 2 wherein R$^3$ is nitro.
4. A disperse dye mixture according to claim 3 wherein R$^4$ is methyl.
5. A disperse dye mixture according to claim 4 containing from 87.5 to 92.5% by weight of the dye of Formula I and from 12.5 to 7.5% by weight of the dye of Formula II.
6. A disperse dye mixture according to claim 5 containing from 89 to 91% by weight of the dye of Formula I and from 9 to 11% by weight of the dye of Formula II.
7. A disperse dye mixture according to claim 6 wherein the dye of Formula I has the structure:

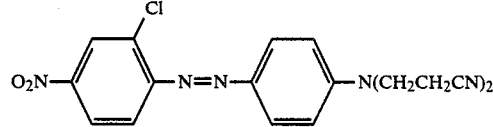

and the dye of Formula II has the structure:

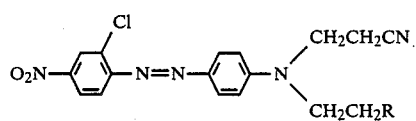

wherein R is as defined in claim 1.

8. A disperse dye mixture according to claim 7 wherein R is —OCOCH$_3$ or —OH.
9. A disperse dye composition comprising a disperse dye mixture according to claim 8 and CI Disperse Blue 79.
10. A process for the coloration of synthetic textile materials which comprises applying thereto by a dyeing, padding or printing technique an aqueous dispersion of a disperse dye mixture according to any of claim 8.
11. A process for the coloration of synthetic textile materials which comprises applying thereto by a dyeing, padding or printing technique an aqueous dispersion of a disperse dye composition according to claim 9.
12. A process according to claim 11 wherein a package dyeing technique is used.
13. A process according to claims 12 wherein the synthetic textile material comprises an aromatic polyester textile material.

* * * * *